US012563326B2

(12) United States Patent
Gheldof et al.

(10) Patent No.: US 12,563,326 B2
(45) Date of Patent: Feb. 24, 2026

(54) LOUDSPEAKER ASSEMBLY FOR USE OUTDOORS

(71) Applicant: PSS Belgium NV, Dendermonde (BE)

(72) Inventors: Karel Gheldof, Dendermonde (BE); Kurt Vandijck, Dendermonde (BE); Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 204 days.

(21) Appl. No.: 18/549,153

(22) PCT Filed: Mar. 10, 2022

(86) PCT No.: PCT/EP2022/056129
§ 371 (c)(1),
(2) Date: Sep. 5, 2023

(87) PCT Pub. No.: WO2022/189546
PCT Pub. Date: Sep. 15, 2022

(65) Prior Publication Data
US 2024/0163593 A1 May 16, 2024

(30) Foreign Application Priority Data
Mar. 12, 2021 (GB) ...................................... 2103451

(51) Int. Cl.
*H04R 1/02* (2006.01)

(52) U.S. Cl.
CPC ...................................... *H04R 1/02* (2013.01)

(58) Field of Classification Search
CPC ....... H04R 1/02; H04R 2499/13; H04R 1/023
See application file for complete search history.

(56) References Cited

U.S. PATENT DOCUMENTS

| | | | |
|---|---|---|---|
| 3,909,530 | A | 9/1975 | Gosswiller |
| 3,995,125 | A | 11/1976 | Cypser |
| 8,712,091 | B2 | 4/2014 | Taylor et al. |
| 10,406,976 | B2 | 9/2019 | Bednar et al. |

(Continued)

FOREIGN PATENT DOCUMENTS

| | | | |
|---|---|---|---|
| CA | 1009579 | A | 5/1977 |
| CA | 1043268 | A | 11/1978 |

(Continued)

OTHER PUBLICATIONS

International Search Report and Written Opinion as mailed on Jun. 29, 2022, issued in corresponding International Application No. PCT/EP2022/056129, filed Mar. 10, 2022, 10 pages.

(Continued)

*Primary Examiner* — Tuan D Nguyen
(74) *Attorney, Agent, or Firm* — Christensen O'Connor Johnson Kindness PLLC

(57) ABSTRACT

A loudspeaker assembly for use outdoors. The loudspeaker assembly includes: a loudspeaker, including a drive unit and a diaphragm, wherein the drive unit is configured to move the diaphragm along a movement axis, a grille, positioned in front of a front face of the loudspeaker, the grille being configured to permit sound produced by the front face of the diaphragm to pass through the grille, and to inhibit the ingress of water incident on the front face of the grille from entering into a space enclosed between a rear face of the grille and the front face of the loudspeaker.

14 Claims, 8 Drawing Sheets

(56) References Cited

U.S. PATENT DOCUMENTS

| | | | |
|---|---|---|---|
| 2012/0194328 | A1 | 8/2012 | Nakayama et al. |
| 2012/0294120 | A1 | 11/2012 | Sakurai et al. |
| 2012/0321121 | A1 | 12/2012 | Taylor et al. |
| 2020/0413173 | A1 | 12/2020 | Vavron |

FOREIGN PATENT DOCUMENTS

| | | | |
|---|---|---|---|
| CN | 102811397 | A | 12/2002 |
| CN | 102625218 | A | 8/2012 |
| CN | 102811397 | B | 6/2015 |
| CN | 106664468 | A | 5/2017 |
| CN | 208821068 | U | 5/2019 |
| CN | 110226332 | A | 9/2019 |
| DE | 849253 | C | 9/1952 |
| DE | 202004001166 | U1 | 4/2004 |
| EP | 2530951 | A1 | 12/2012 |
| EP | 2530951 | B1 | 3/2019 |
| FR | 2748627 | A1 | 11/1997 |
| FR | 2983025 | A1 | 5/2013 |
| JP | H08230573 | A | 9/1976 |
| JP | S51154529 | U | 12/1976 |
| JP | S5696784 | U | 7/1981 |
| JP | S5726180 | U | 2/1982 |
| JP | H07107579 | A | 4/1995 |
| JP | H09327082 | A | 12/1997 |
| JP | 2000078691 | A | 3/2000 |
| JP | 3642075 | B2 | 2/2005 |
| JP | 2003190544 | A | 7/2008 |
| JP | 2012153303 | A | 8/2012 |
| JP | 2013009283 | A | 1/2013 |
| JP | 5440562 | B2 | 3/2014 |
| JP | 2020096214 | A | 6/2020 |

OTHER PUBLICATIONS

"Federal Motor Vehicle Safety Standard No. 141, Minimum Sound Requirements for Hybrid and Electric Vehicles", Federal Register, vol. 83, No. 38, Feb. 26, 2028, 17 pages.

"Uniform provisions concerning the approval of Quiet Road Transport Vehicles with regard to their reduced audibility", UN Regulation No. 138, E/ECE/TRANS/505/Rev.2/Add.137/Rev.1, Nov. 16, 2013, 40 pages.

National Standard of the People's Republic of China GB/T 37153-2018, "Acoustic vehicle alerting system of electric vehicles running at low speed", Dec. 28, 2018, 20 pages.

Examination Report mailed Dec. 20, 2024, issued in corresponding European Application No. EP20220713897, filed Mar. 10, 2022, 13 pages.

Third Party Observation mailed Sep. 2, 2024, issued in corresponding European Application No. EP20220713897, filed Mar. 10, 2022, 69 pages.

Musk, E. [@elonmusk]. (Oct. 6, 2019). Customized horn & movement sounds (coconuts being one, of course) coming to Teslas soon [Post]. X. https://x.com/elonmusk/status/1180877114226008064, 1 page.

Fig. 2F(ii)

LOUDSPEAKER ASSEMBLY FOR USE OUTDOORS

CROSS REFERENCE TO RELATED APPLICATIONS

This application is a National Stage of International Application No. PCT/EP2022/056129, filed Mar. 10, 2022, which claims priority to GB2103451.7, filed on Mar. 12, 2021, the entirety of which are hereby incorporated by reference for all purposes.

FIELD OF THE INVENTION

The present invention relates to a loudspeaker assembly for use outdoors.

BACKGROUND

A loudspeaker for use outdoors is intended to refer to a loudspeaker assembly suitable for use (preferably configured for use) with at least part of the loudspeaker assembly exposed to the open air, i.e. not inside a shelter or building.

Due to legal requirements and general pedestrian safety awareness, many current and future electrical and hybrid cars need to make use of an Acoustic Vehicle Alerting System ("AVAS").

In particular, according to UN Regulation 138 dated 16 Nov. 2017 (E/ECE/324/Rev.2/Add.137/Rev.1-E/ECE/TRANS/505/Rev.2/Add.137/Rev.1) car manufacturers must install an AVAS in four-wheeled electric and hybrid electric vehicles that are approved from Jul. 1, 2019, and to all new quiet electric and hybrid vehicles registered from July 2021. The vehicle must make a continuous noise level of at least 56 dBA (within 2 meters) if the car is going 20 km/h (12 mph) or slower, and a maximum of 75 dBA.

The new regulation is intended to make it compulsory to have acoustic systems within electric road vehicles for pedestrians, and especially visually impaired persons to more easily hear electric cars approach.

In the US, the relevant standard is the "Federal Motor Vehicle Safety Standard No. 141, Minimum Sound Requirements for Hybrid and Electric Vehicles" (83 FR 8182; NHTSA-FMVSS141).

These new regulations require an AVAS to generate a sound when electric road vehicles are reversing or running below 20 km/h for Europe and 30 km/h for US markets. The reason for limiting the speed is that at higher speeds the tire noise usually drowns out the engine. If the combustion engine of a hybrid vehicle is running, the AVAS should not make any noise and vehicles that already emit a warning sound anyway when reversing does not have to produce any additional noise.

An AVAS typically consists out of an engine control unit ("ECU") and a loudspeaker (which may also be referred to as an acoustic transducer). The loudspeaker is typically placed in the vehicle exterior.

AVAS loudspeakers are typically electrodynamic loudspeakers in which the component materials have been adapted for maximum reliability in harsh conditions that make occur in the vehicle exterior.

Loudspeakers for use outdoors are disclosed in each of the following earlier patent documents:

U.S. Pat. No. 3,909,530
U.S. Pat. No. 3,995,125
US2012/194328A1
EP2530951A1

JP3642075B2
JPH08230573A
JPH09327082A
JPS5696784U
JPS5726180U
US2012/294120A1
JPH07107579A

The grilles described in these earlier patent documents are primarily intended for use in weather-proof notification devices. Some of them are specifically intended for use as an AVAS loudspeaker. In general terms, these grilles have been designed to reduce the impact of waterjet or solid objects on the diaphragm of a loudspeaker. Since loudspeaker diaphragms are typically formed of lightweight material, they could be easily damaged by high pressure water jet or solid object impact. Therefore, the grilles used to protect loudspeaker diaphragms are typically constructed using a stiff material, having a labyrinthine structure so as to prevent or minimise a direct line of sight from outside onto the loudspeaker diaphragm.

However, as discussed below in more detail with reference to FIGS. 1A and 1B, the present inventors have observed that the grilles described in these earlier patent documents can have a negative impact on the SPL response of the loudspeaker assemblies of which they are a part.

The present inventors note it would be desirable to mechanically protect a loudspeaker diaphragm (e.g. to avoid problems caused by direct stone or water jet impact), whilst maintaining an acoustic performance that is as good as possible, particularly at frequencies important for AVAS loudspeakers (typically in the range 1.8 kHz-3.6 kHz).

The present invention has been devised in light of the above considerations.

SUMMARY OF THE INVENTION

A first aspect of the present invention may provide:

A loudspeaker assembly for use outdoors, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis, wherein the loudspeaker has a front face that faces in the forwards direction and includes the front face of the diaphragm;

a grille, positioned in front of the front face of the loudspeaker, with a rear face of the grille facing in the rearwards direction toward the front face of the loudspeaker, and with a front face of the grille facing in the forwards direction;

wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker when the loudspeaker is in use;

wherein V1/V2≤0.7, wherein V1 is a volume of space [$cm^3$] enclosed between the front face of the loudspeaker when the diaphragm is in its rest position and the rear face of the grille, and V2 is a volume of space [$cm^3$] enclosed between the front face of the loudspeaker when the diaphragm is in its rest position and a plane (labelled X1 in the figures) perpendicular to the movement axis that has a position along the movement axis corresponding to a forwardmost position of the grille on the movement axis.

The lower the value of V1/V2, the smaller the volume of space that is enclosed between the front face of the loudspeaker and the rear face of the grille when the diaphragm is in its rest position.

The present inventors have found that having V1/V≤2 0.7 helps to boost the SPL produced by the loudspeaker assembly in frequency ranges thought by the inventors to be important for the production of sound by an AVAS loudspeaker (1.8 kHz-7.2 kHz, and particularly 1.8 kHz-3.6 kHz). This is demonstrated below with reference to an acoustic transfer function ("ATF").

Without wishing the be bound by theory, the present inventors believe a boost in SPL at such frequencies is caused at least in part by the reduced space between the front face of the loudspeaker and the rear face of the grille (i.e. a lower value of V1/V2) changing the nature of a second order lowpass filter formed by air trapped in this space at such frequencies.

If the rear face of the grille includes any gaps (see below), then V1 may be further defined as including any space inside the/each gap in the rear face of the loudspeaker which has a direct line of sight to the front face of the loudspeaker in the direction of the movement axis, up to but extending no further than the plane (labelled X1 in the figures) perpendicular to the movement axis that has a position along the movement axis corresponding to a forwardmost position of the grille on the movement axis.

The first volume V1 and the second volume V2 may be further enclosed by an additional structure which extends around the movement axis, e.g. thereby confining the first volume V1 and the second volume V2 in directions perpendicular to the movement axis. The additional structure may be a rim of the grille or part of a frame of the loudspeaker, for example.

Preferably, V1/V2≤0.5, more preferably V1/V2≤0.3, as this has been found by the inventors to further boost the SPL produced by the loudspeaker assembly in frequency ranges thought by the inventors to be important for the production of sound by an AVAS loudspeaker.

The rest position of the diaphragm may be defined as a position at which the diaphragm is at rest, when the loudspeaker is not in use, preferably without force being exerted on it by the drive unit, preferably with equalised pressure on both front and rear faces of the diaphragm. The rest position may alternatively be described as the "neutral" position.

Preferably, the rear face of the grille is contoured to at least partly follow contours in the front face of the loudspeaker, when the diaphragm is in its rest position. A grille whose rear face is contoured in this way helps to facilitate a reduction in V1/V2 as noted above (by locating the grille so that the rear face of the grille is close to the front face of the loudspeaker).

A skilled person would appreciate that the extent to which the rear face of the grille may be contoured to at least partly follow contours in the front face of the loudspeaker may vary from application to application, depending e.g. on performance requirements, but that the rear face of the grille preferably includes at least one contoured (non-flat) surface whose contours do, to some extent, correspond to contours in the front face of the loudspeaker. The correspondence between contours in the at least one contoured surface of the rear face of the grille and the contours in the front face of the loudspeaker does not need to be exact (and indeed it may be practically difficult to achieve exact correspondence, e.g. if the rear face of the grille is provided by a plurality of grille elements as discussed below). However, there is preferably some degree of correspondence, and thus a grille whose rear face is formed by surfaces which are contoured in a manner that in no way corresponds to contours in the front face of the loudspeaker, should not be viewed as being contoured to at least partly follow contours in the front face of the loudspeaker.

In some examples, the rear face of the grille may be contoured to substantially match contours in the front face of the loudspeaker when the diaphragm is in its rest position. However, as noted above, exact matching in the contours is not a requirement.

For the purposes of the present disclosure, an acoustic transfer function ATF(f) may be understood as a function of frequency f defined as:

$$ATF(f)=SPL_g(f)-SPL_n(f)$$

Where $SPL_g$(f) is sound pressure level of the loudspeaker assembly measured in dB as a function of frequency f when the grille is present and the loudspeaker is mounted in an infinite baffle (smoothed to ⅓th octave band), and $SPL_n$(f) is sound pressure level of the loudspeaker assembly measured in dB as a function of frequency f when the grille is not present but otherwise under the same conditions as for the measurement of $SPL_g$(f).

$SPL_g$(f) and $SPL_n$(f) may be measured on the movement axis at a fixed distance (e.g. 1 metre) from the loudspeaker on the principal radiating axis extending from the front face of the diaphragm of the loudspeaker. Herein, a principal radiating axis may be understood as an axis along which the front face of the diaphragm produces direct sound at maximum amplitude (sound pressure level). Typically, the principal radiating axis of front face of the diaphragm will extend outwardly from a central location on the front face of the diaphragm.

According to this definition, where ATF(f) falls under 0 dB, the fall represents an attenuation in $SPL_g$(f) caused by the presence of the grille (compared with when the grille is not present). Similarly, where ATF(f) rises above 0 dB, the rise represents a boost in SPL caused by the presence of the grille (compared with when the grille is not present).

In other examples, $SPL_g$(f) and $SPL_n$(f) may be measured off axis instead, since the acoustic effect can be observed both on axis and off axis.

Preferably, the grille is configured (e.g. by configuring it according to one or more teachings provided herein) such that the acoustic transfer function is higher than 3 dB for at least some frequencies in the range 1.8 kHz-7.2 kHz.

As noted above, frequencies in the two octave frequency range 1.8 kHz-7.2 kHz (and particularly the narrower, one octave frequency range 1.8 kHz-3.6 kHz) are thought by the inventors to be important for the production of sound by an AVAS loudspeaker. An acoustic transfer function that is higher than 3 dB for at least some frequencies in the range 1.8 kHz-7.2 kHz (and particularly the narrower, one octave frequency range 1.8 kHz-3.6 kHz), means a higher SPL at frequencies that are important for AVAS loudspeakers (e.g. to generate a loud horn sound).

In other words, not only can a large drop as shown in FIG. 1B be avoided at such frequencies, but a boost in SPL is preferably achieved instead.

Preferably, the grille is configured (e.g. by configuring it according to one or more teachings provided herein) such that the acoustic transfer function is higher than 3 dB for at least some frequencies in the range 1.8 kHz-3.6 kHz (a particularly important frequency band for the production of sound by an AVAS loudspeaker.

The precise frequencies at which the acoustic transfer function is boosted to be higher than 3 dB in an above-stated range (e.g. in the range 1.8 kHz-7.2 kHz, or the range 1.8 kHz-3.6 kHz) will typically vary depending on a number of parameters including, for example, V1/V2, the precise shape of the front face of the diaphragm, the precise shape of the rear face of the grille, the extent to which a grille is inhibiting water ingress (e.g. as parameterized by A1/A2 as discussed below), and the extent to which the grille is acoustically closed (e.g. as parameterized by A1/A3 as discussed below). These properties of the loudspeaker can therefore be tuned to produce a boost at particular frequencies of interest in an above-stated range whilst inhibiting the ingress of water.

In some examples, the grille may be configured (e.g. by configuring it according to one or more teachings provided herein) such that the acoustic transfer function is higher than 6 dB for at least some frequencies in an above-stated range (e.g. in the range 1.8 kHz-7.2 kHz, or the range 1.8 kHz-3.6 kHz), see e.g. the example of FIGS. 4A-B.

Preferably, the grille is configured (e.g. by configuring it according to one or more teachings provided herein) such that the acoustic transfer function is higher than 0 dB, more preferably higher than 3 dB, for at least half of the ⅓th octave bands in an above stated range (i.e. preferably the boost is over the majority of frequencies in an above-stated range).

Preferably, the grille is configured (e.g. by configuring it according to one or more teachings provided herein) such that the acoustic transfer function is higher than 0 dB for all frequencies in an above stated range.

Preferably, the grille is configured (e.g. by configuring it according to one or more teachings provided herein) such that the acoustic transfer function does not fall below −10 dB (more preferably −5 dB, more preferably 0 dB) at any frequency in a frequency range in which the loudspeaker assembly is rated for use ("rated frequency range"). The rated frequency range preferably includes the frequency range 2 kHz-3.5 kHz, but could cover much broader frequency ranges, e.g. 2 kHz-7 kHz.

Preferably, the grille is configured (e.g. by configuring it according to one or more teachings provided herein) such that the acoustic transfer function does not fall below −10 dB (more preferably −5 dB, more preferably 0 dB) at any frequency in the range 1.8 kHz-3.6 kHz. Avoiding large drops in the acoustic transfer function in such ranges helps to provide better sound quality at frequencies which are believed to be particularly important for an AVAS loudspeaker.

Preferably, A1/A2≥5, wherein A1 is the area corresponding to the movable part of the front face of the loudspeaker as projected onto a plane perpendicular to the movement axis [$cm^2$], and A2 is the area within A1 which has a direct line of sight to the front face of the loudspeaker in the direction of the movement axis [$cm^2$].

The movable part of the front face of the loudspeaker would typically include the front face of the diaphragm (including any dust cap mounted to the diaphragm, such as the dustcap 138 shown in FIG. 2B) and the non-fixed part of any suspension located at the front face of the loudspeaker (such as the roll suspension 136 shown in FIG. 2B).

The plane perpendicular to the movement axis could for example be the plane X1 as shown in the figures discussed below.

A1/A2 can be viewed as indicating the degree to which the grille physically obstructs straight line paths extending from the front face of the loudspeaker (when the diaphragm is in its rest position) to a position in front of the front face of the grille in a direction parallel to the movement axis.

For example, if A1/A2 were infinite, this could be understood as meaning that the grille is configured to physically obstruct substantially all straight line paths extending from the front face of the loudspeaker to a position in front of the front face of the grille in a direction parallel to the movement axis.

For example, if A1/A2 were 1.11, this could be understood as meaning that the grille is configured to physically obstruct only 10% of straight line paths extending from the front face of the loudspeaker to a position in front of the front face of the grille in a direction parallel to the movement axis.

A1/A2 thus essentially characterizes the extent to which the grille is able to inhibit the ingress of water incident on the front face of the grille from entering into a space enclosed between the rear face of the grille and the front face of the loudspeaker when the loudspeaker is in use.

The present inventors have found that A1/A2≥5 helps to provide a high degree of water ingress protection. A1/A2 has been found to have an effect on the ATF, albeit a less impactful effect compared with V1/V2 and A1/A3 discussed elsewhere.

Preferably, A1/A2≥10, more preferably A1/A2≥20.

Preferably, A1/A3≥3, wherein A1 is as defined above [$cm^2$], and A3 is the area which is the sum of cross-sectional areas of all openings in the grille which allow for airborne sound propagation through the grille, wherein for each of said openings, the cross-sectional area of the opening is defined as the minimum cross-section of the opening along the path of airborne sound propagation through the opening [$cm^2$]. For avoidance of any doubt, there could just be one opening in the grille, in which case the sum of cross-sectional areas of all openings in the grille would be the cross-sectional area of the one opening in the grille.

Preferably, A1/A3≥3, more preferably A1/A3≥6, more preferably A1/A3≥10.

A1/A3 can be viewed as indicating the degree to which the grille is acoustically closed.

For example, if A1/A3 were infinite, this could be understood as meaning that the grille is configured to physically obstruct substantially all airborne sound propagation (i.e. airborne sound waves) from the loudspeaker.

For example, if A1/A3 were 1.11, this could be understood as meaning that the grille is configured to physically obstruct only 10% of air propagated sound waves from the loudspeaker (and could be considered as acoustically very open).

The present inventors have found that A1/A3≥3 (more preferably A1/A3≥6, more preferably A1/A3≥10) helps to provide an ATF having desired properties as described above. In particular, high levels of gain can be achieved with A1/A3≥3 (more preferably A1/A3≥6, more preferably A1/A3≥10) when implemented in combination with a V1/V2≤0.7 (more preferably V1/V2≤0.5, more preferably V1/V2≤0.3). Whereas lower levels of A1/A3 may lead to minor or no gains in the ATF within the said rated frequency range.

For comparative purposes, typical HiFi grilles for in-home user have A1/A2 of 2 or less and have a A1/A3 of 2 or less (and are not suitable for use outdoors).

A1, A2 and A3 (discussed herein) should be as determined when the diaphragm is in its rest position.

Preferably, a distance h measured between the front face of the loudspeaker when the diaphragm is in its rest position and the rear face of the grille (excluding any gaps in the rear face of the grille) in the direction of the movement axis, does not exceed X mm (wherein this criterion preferably applies for h as measured from any location on the front face of the loudspeaker for which a straight line, which extends from the location on the front face of the loudspeaker in the direction of the movement axis, intersects with the rear face of the grille). This is one way in which the rear face of the grille can be viewed as being contoured to at least partly follow the front face of the diaphragm. X mm may be 15 mm, more preferably 10 mm, more preferably 5 mm. With such values of X mm, the present inventors have found that an acoustic transfer function having desirable properties (e.g. as discussed above) can be obtained for the most commonly used sizes of loudspeaker.

The grille may have a porous structure which defines passages extending from gaps in the rear face of the grille to gaps in the front face of the grille.

The grille may have a labyrinthine structure, which defines non-linear passages (each passage having at least one bend therein) extending from gaps in the rear face of the grille to gaps in the front face of the grille.

Thus, a grille having a labyrinthine structure can be viewed as a grille having a porous structure, with the additional requirement that the passages are non-linear passages (each passage preferably having at least one bend therein).

A porous structure (of which a labyrinthine structure represents one subset of examples) helps to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker.

A grille having a porous structure, preferably a labyrinthine structure, may take various forms, as would be appreciated by a skilled person reading the present disclosure.

In some examples, the grille may be formed by a plurality of grille elements, extending across the front face of the loudspeaker, and arranged with respect to each other so as to define the passages extending from gaps in the rear face of the grille to gaps in the front face of the grille. The rear face of the grille may be formed by contoured surfaces on at least a subset of the grille elements, spaced apart from each other to provide the gaps in the rear face of the grille. Each grille element may extend across the front face of the loudspeaker in substantially the same direction perpendicular to the movement axis. The plurality of grille elements are preferably arranged to provide a preferred A1/A2 and/or A1/A3 value as indicated above.

The plurality of grille elements may include a first subset of grille elements and a second subset of grille elements, wherein the rear face of the grille is formed by contoured surface on the first subset of the grille elements, wherein the first subset of grille elements are spaced apart from each other to provide the gaps in the rear face of the grille, wherein the second subset of the grille elements are located in the gaps, preferably recessed from the first subset of grille elements. The first and second subsets of grille elements are preferably arranged to provide A1/A2 and/or A1/A3 values indicated above.

The grille may include a rim wherein each grille element is mounted to the rim.

In some other examples, the grille may be formed by a one-piece grille element which provides the front and rear faces of the grille, and which has through-holes which define the passages extending from gaps in the rear face of the grille to gaps in the front face of the grille.

The grille is preferably formed of a rigid material.

The loudspeaker may include a frame from which the diaphragm is suspended by at least one suspension.

For example, an outer edge of the diaphragm may be suspended from the frame by a roll suspension.

Another part of the diaphragm (preferably inwardly spaced from the outer edge of the diaphragm) may be suspended from the frame by a further suspension (e.g. a spider).

The front face of the diaphragm may be concave and the rear face of the diaphragm may be convex. For example, the diaphragm may be conical, with a concave radiating surface on the concave side of the diaphragm providing the front face of the diaphragm, and a convex radiating surface on the convex side of the diaphragm providing the rear face of the diaphragm. Other diaphragm shapes are well-known.

The diaphragm may be flat in some examples, though is preferably non-flat.

If a dustcap is mounted on the front face of the diaphragm, the dustcap may optionally be considered as being part of the diaphragm, with a front face of the dustcap (a face of the dustcap facing in the forwards direction) being considered as part of the front face of the diaphragm (and thus part of the front face of the loudspeaker). The rear face of the grille may be contoured to at least partly follow contours in the front face of the dustcap.

The drive unit may be an electromagnetic drive unit that includes a magnet unit configured to produce a magnetic field in an air gap, and a voice coil attached to the diaphragm (typically via an intermediary coupling element, such as a voice coil former). The magnet unit may be attached to the frame. In use, the voice coil may be energized (have a current passed through it based on the electrical signal) to produce a magnetic field which interacts with the magnetic field produced by the magnet unit and which causes the voice coil (and therefore the diaphragm) to move relative to the magnet unit along the movement axis. The magnet unit may include a permanent magnet. The voice coil may be configured to sit in the air gap when the diaphragm is at rest. Such drive units are well known.

The loudspeaker assembly may include an enclosure configured to receive sound (pressure) produced by a rear face of diaphragm, and to inhibit sound (pressure) produced by the rear face of diaphragm from leaking into the environment.

The loudspeaker assembly may be configured for use with the front face of the grille exposed to an outdoor environment (in which case the loudspeaker assembly can be considered as being for use outdoors, even if the remainder of the loudspeaker assembly is enclosed).

Preferably, the rear face of the grille is configured to (e.g. by appropriately contouring the rear face of the grille, and positioning it appropriately along the movement axis) physically contact the front face of the diaphragm at multiple locations dispersed across the front face of the diaphragm when the diaphragm is pushed in the forwards direction to a predefined mechanical stop position, so as to prevent the diaphragm from moving beyond the predefined mechanical stop position when the loudspeaker is in use.

In this way, the rear face of the grille can act as a mechanical stop (or an "outward excursion mechanical limiter") which prevents the diaphragm from moving beyond the predefined mechanical stop position when the loudspeaker is in use.

The predefined mechanical stop position is preferably further along the movement axis in the forwards direction than the diaphragm will be moved to by the drive unit during normal operation of the loudspeaker assembly, e.g. when pressure is equalised at both the front and rear faces of the diaphragm. This is because it is preferable for there to be no physical contact between the rear face of the grille and the front face of the diaphragm during normal operation of the loudspeaker assembly, since this would create undesired buzzing noises.

The predefined mechanical stop position is preferably not so far along the movement axis in the forwards direction such that pushing the diaphragm to the mechanical stop position would cause damage to the loudspeaker (e.g. by deforming the diaphragm, by damaging a suspension which suspends the diaphragm from a frame of the loudspeaker, or by removing a voice coil from an air gap).

In this way, the rear face of the grille may help to prevent damage of the loudspeaker in the event of an overpressure situation in which a pressure at the rear face of the diaphragm (e.g. due to a pressure build up in an enclosure configured to receive sound produced by the rear face of the diaphragm) pushes the diaphragm in the forwards direction.

The multiple locations on the front face of the diaphragm preferably include locations which are at different radial positions relative to a principal radiating axis. If a dustcap is mounted to the front face of the loudspeaker, the multiple locations dispersed across the front face of the diaphragm preferably further include locations on a front face of the dustcap.

If the grille is formed by a plurality of grille elements (see above), then preferably each contoured surface on a grille element that forms part of the rear face of the grille is configured to physically contact the front face of the diaphragm when the diaphragm is pushed in the forwards direction to a predefined mechanical stop position. This helps to ensure the multiple locations are dispersed across the front face of the diaphragm.

The loudspeaker assembly may be configured for use in a road vehicle with the front face of the grille exposed to an outdoor environment.

The loudspeaker assembly may form part of an Acoustic Vehicle Alerting System (AVAS).

A second aspect of the present invention may provide:

A loudspeaker assembly for use outdoors, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis, wherein the loudspeaker has a front face that faces in the forwards direction and includes the front face of the diaphragm;

a grille, positioned in front of the front face of the loudspeaker, with a rear face of the grille facing in the rearwards direction toward the front face of the loudspeaker, and with a front face of the grille facing in the forwards direction;

wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker when the loudspeaker is in use.

This is the same as a loudspeaker assembly according to the first aspect of the invention, but without the requirement that $V1/V2 \leq 0.7$.

The loudspeaker assembly according to the second aspect of the invention may include any feature or combination of features described above in connection with the first aspect of the invention, but without necessarily requiring $V1/V2 \leq 0.7$.

By way of example, the second aspect of the present invention may provide:

A loudspeaker assembly for use outdoors, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis, wherein the loudspeaker has a front face that faces in the forwards direction and includes the front face of the diaphragm;

a grille, positioned in front of the front face of the loudspeaker, with a rear face of the grille facing in the rearwards direction toward the front face of the loudspeaker, and with a front face of the grille facing in the forwards direction;

wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker when the loudspeaker is in use;

wherein a distance h measured between the front face of the loudspeaker when the diaphragm is in its rest position and the rear face of the grille (excluding any gaps in the rear face of the grille) in the direction of the movement axis, does not exceed X mm (where this criterion preferably applies for h as measured from any location on the front face of the loudspeaker for which a straight line, which extends from the location on the front face of the loudspeaker in the direction of the movement axis, intersects with the rear face of the grille), where X may be 15 mm, more preferably 10 mm, more preferably 5 mm.

By way of example, the second aspect of the present invention may provide:

A loudspeaker assembly for use outdoors, the loudspeaker assembly including:

a loudspeaker, including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis, wherein the loudspeaker has a front face that faces in the forwards direction and includes the front face of the diaphragm;

a grille, positioned in front of the front face of the loudspeaker, with a rear face of the grille facing in the rearwards direction toward the front face of the loudspeaker, and with a front face of the grille facing in the forwards direction;

wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker when the loudspeaker is in use;

wherein the grille is configured (e.g. by shaping it according to teachings provided herein) such that the acoustic transfer function is higher than 3 dB for at least some frequencies in the range 1.8 kHz-7.2 kHz.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1A:
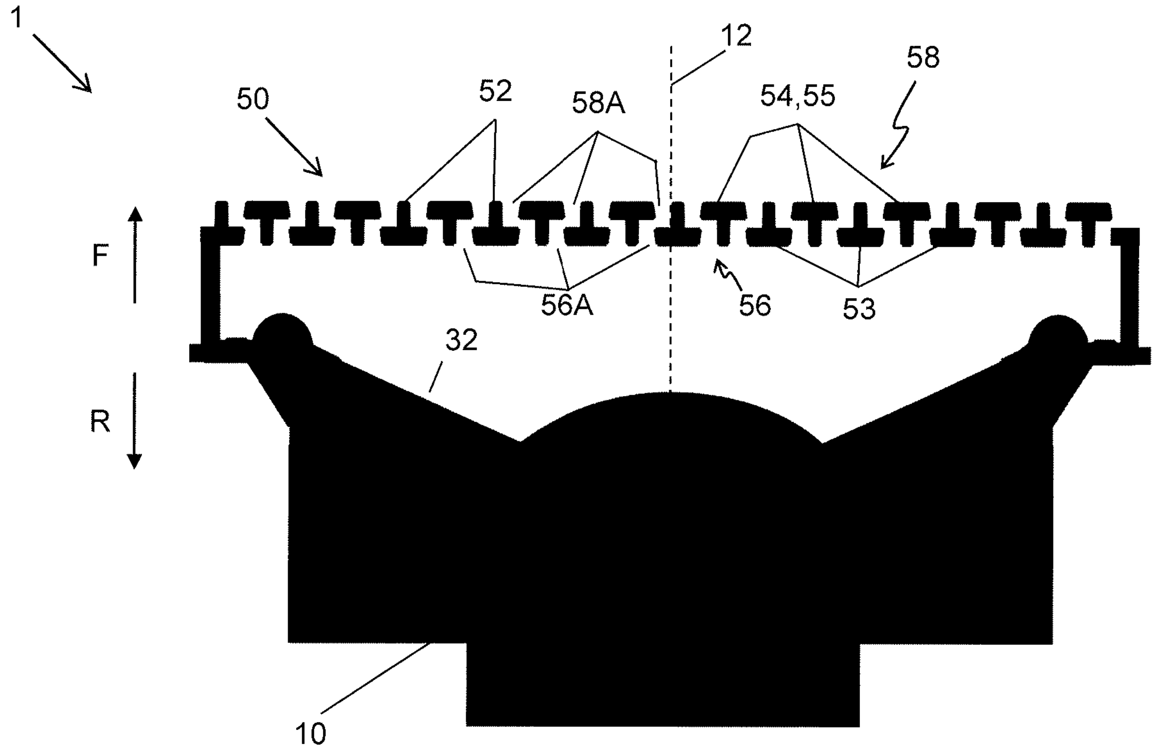
FIG. 1A shows a loudspeaker assembly including a loudspeaker and a grille, with the grille made so as to be similar in structure to that shown in JPH09327082A.

FIG. 1A shows a cross-section of a loudspeaker assembly 1 including a loudspeaker 10 and a grille 50, with the grille 50 made so as to be similar in structure to that shown in JPH09327082A.

The loudspeaker 10 (shown here in silhouette), includes a drive unit and a diaphragm, wherein the drive unit is configured to move the diaphragm along a movement axis 12, wherein the diaphragm has a front face 32 that faces in a forwards direction F parallel to the movement axis 12 and a rear face that faces in a rearwards direction R parallel to the movement axis. The loudspeaker 10 has a front face that faces in the forwards direction F and includes the front face of the diaphragm 32 (as well as a roll suspension, and a part of a loudspeaker frame, though this isn't shown clearly in FIG. 1A).

The grille 50 is formed by a plurality of grille elements 52, 54 extending across the front face 32 of the loudspeaker 10, and arranged with respect to each other so as to define passages extending from gaps 56A in a rear face 56 of the grille 50 to gaps 58A in a front face 58 of the grille 50.

Here, the rear face of the grille 50 is formed by flat surfaces 53 on a first subset of the grille elements 52, spaced apart from each other to provide the gaps 56A in the rear face 56 of the grille 50. The flat surfaces 53 on the first subset of the grille elements 52 face towards the front face of the loudspeaker (which includes the front face 32 of the diaphragm).

The front face 58 of the grille 50 is formed by flat surfaces 55 on a second subset of the grille elements 54, spaced apart from each other to provide the gaps 58A in the front face 58 of the grille 50. The flat surfaces 55 on the subset of the grille elements 54 face away from the front face 32 of the diaphragm.

The second subset of the grille elements 54 are recessed from the first subset of grille elements 52, and located in the gaps 56A in the rear face 56 of the grille 50, so as to physically obstruct substantially all straight line paths extending from a front face of the diaphragm to a position in front of the front face of the grille in a direction parallel to the movement axis 12.

For the loudspeaker assembly 1, the parameter V1/V2 is ~0.85, the parameter A1/A2 is very large (potentially infinite) and parameter A1/A3 is ~4.

For the grille 50 of FIG. 1A, the grille elements 52, 54 have a "double T" internal structure, with a flat rear face 56 formed by flat surfaces 53 on the first subset of grille elements 52, and a flat front face 58 formed by flat surfaces on the second subset of grille elements 54.

Figure 1B:
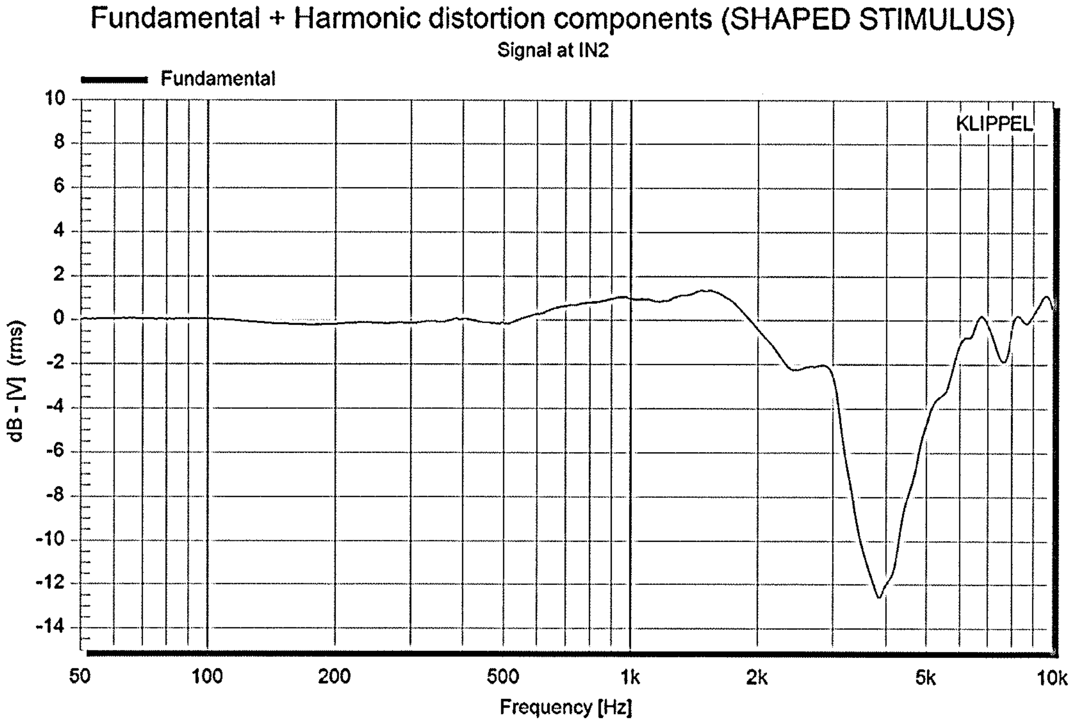
FIG. 1B shows the acoustic transfer function ATF(f) for the loudspeaker of FIG. 1A.

FIG. 1B shows the acoustic transfer function ATF(f) for the loudspeaker assembly 1 of FIG. 1A (smoothed to ⅓th octave band).

As shown by FIG. 1B, there is a sharp loss in SPL in the frequency range 3 kHz-5.5 kHz. Without wishing to be bound by theory, the present inventors believe this sharp loss in SPL is caused by the grille 50 acting as a second order band-stop filter on the acoustic transfer function of the loudspeaker, to inhibit SPL in the frequency range 3 kHz-5.5 kHz. In more detail, the present inventors believe that the band stop filter is formed by an acoustic mass spring in which the acoustic mass is the air in the grille 50, and the spring is the air trapped in V1 between the front face of the loudspeaker and the rear face 56 of the grille 50. The present inventors also believe that this filter also causes disruption in the acoustic transfer function above 5.5 kHz, as can also be seen in FIG. 1B.

This is not desirable performance for an AVAS loudspeaker assembly.

Figure 2A:
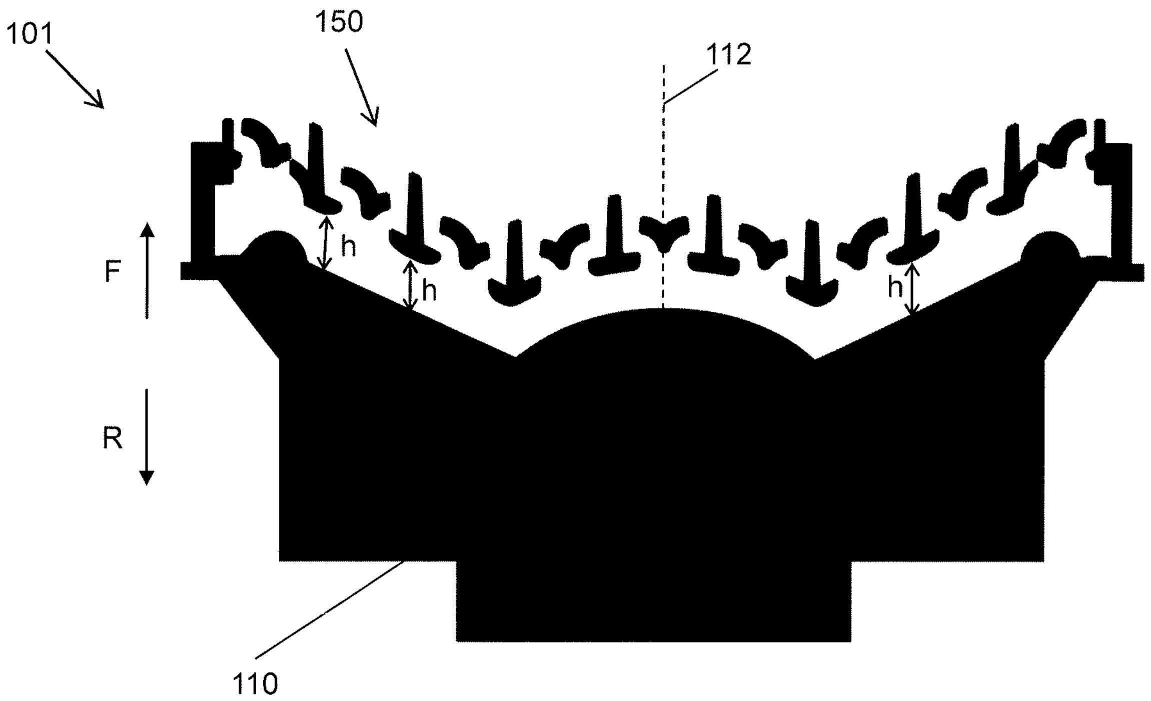
FIG. 2A shows a first loudspeaker assembly according to the present disclosure.

FIG. 2A shows a cross-section of a first loudspeaker assembly 101 according to the present disclosure.

The loudspeaker assembly 101 includes a loudspeaker 110 (shown in FIG. 2A in silhouette) and a grille 150.

Figure 2B:
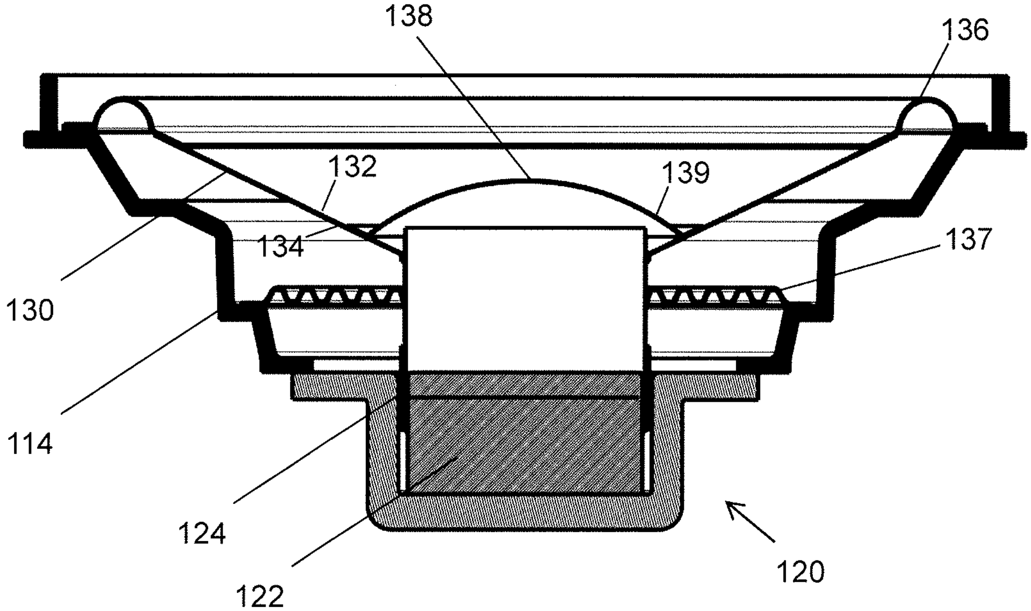
FIG. 2B shows the loudspeaker of the first loudspeaker assembly of FIG. 2A in more detail (rather than in silhouette), with the grille omitted for clarity.

FIG. 2B shows the loudspeaker 110 of the first loudspeaker assembly 101 in more detail, with the grille 150 omitted for clarity.

Figure 2C:
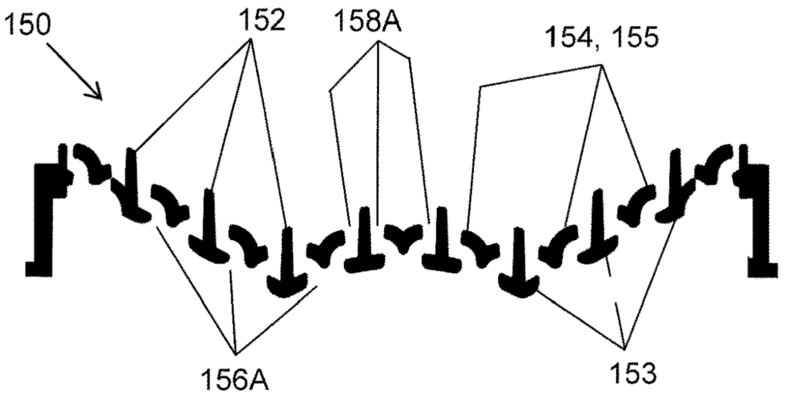
FIGS. 2C-E show the grille of FIG. 2A of the first loudspeaker assembly of FIG. 2A in more detail.
Figure 2D:
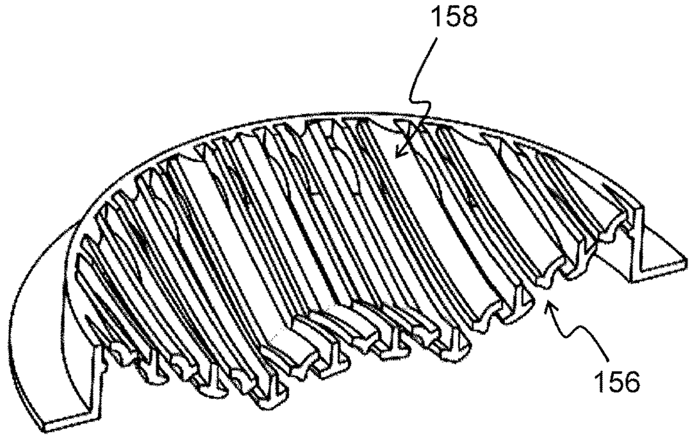
Figure 2E:
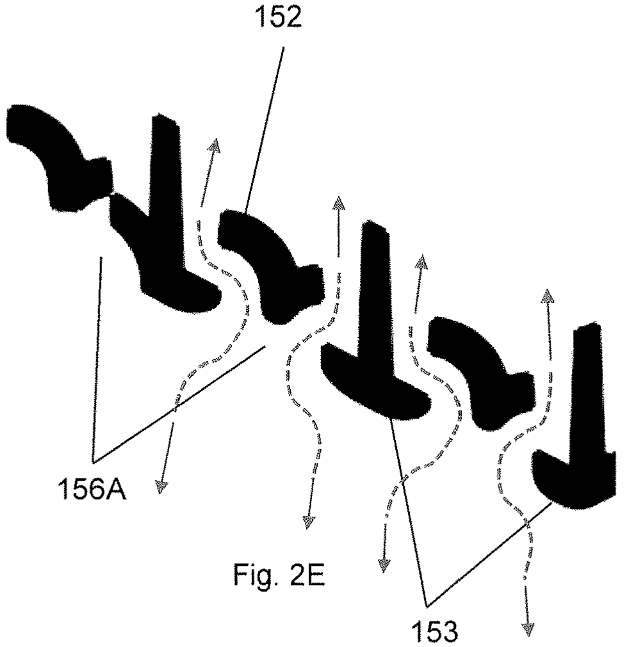

FIGS. 2C-2E show the grille 150 of the first loudspeaker assembly 101 in more detail.

The loudspeaker 110, includes a frame 114, a drive unit 120 and a diaphragm 130, wherein the drive unit 120 is configured to move the diaphragm 130 along a movement axis 112, wherein the diaphragm has a front face 132 that faces in a forwards direction F parallel to the movement axis 112 and a rear face 134 that faces in a rearwards direction R parallel to the movement axis. The loudspeaker 110 has a front face that faces in the forwards direction F and includes the front face of the diaphragm 132 (as well as a front face of the roll suspension 136, and a part of the frame 114, as can be seen in FIG. 2B).

In this example, the drive unit 120 is an electromagnetic drive unit that includes a magnet unit 122 configured to produce a magnetic field in an air gap, and a voice coil 124 attached to the diaphragm (typically via an intermediary coupling element, such as a voice coil former). The magnet unit 122 includes a permanent magnet and is attached to the frame 114. In use, the voice coil 124 may be energized (have a current passed through it based on the electrical signal) to produce a magnetic field which interacts with the magnetic field produced by the magnet unit 122 and which causes the voice coil 124 (and therefore the diaphragm) to move relative to the magnet unit along the movement axis 112.

In this example, a dustcap 138 is mounted on the front face 132 of the diaphragm 130. For the purposes of this example, the dustcap can be considered as being part of the diaphragm 130, with a front face 139 of the dustcap 138 being considered as part of the front face 132 of the diaphragm 130.

In this example, the diaphragm 130 is suspended from the frame 114 by two suspensions 136, 137 in the form of a roll suspension 136 and a spider 137.

In this example, the grille 150 is formed by a plurality of grille elements 152, 154 extending across the front face 132 of the diaphragm 130 of the loudspeaker 110, and arranged with respect to each other so as to define passages extending from gaps 56A in a rear face 156 of the grille 150 to gaps 58A in a front face 158 of the grille 150. The grille elements are mounted to a rim 151 of the grille 150.

In this example, a first subset of the grille elements 152 have a "T" shape when viewed in cross-section, and a second subset of the grille elements 154 have a "V" shape when viewed in cross-section. Other forms are of course possible.

The rear face 156 of the grille 150 is formed by contoured surfaces 153 on the first subset of the grille elements 152, spaced apart from each other to provide the gaps 156A in the rear face 156 of the grille 150. The contoured surfaces 153 on the first subset of the grille elements 152 face towards the front face 122 of the diaphragm 130.

The front face 158 of the grille 150 is formed by contoured surfaces 155 on the second subset of the grille elements 154, spaced apart from each other to provide the gaps 158A in the front face 158 of the grille 150. The contoured surfaces 155 on the subset of the grille elements 154 face away from the front face 122 of the diaphragm.

The second subset of the grille elements 154 are recessed from the first subset of grille elements 152, and located in the gaps 156A in the rear face 156 of the grille 150. This results in non-linear passages, each passage having at least one bend therein (shown most clearly in FIG. 2E), such that the grille 150 physically obstructs substantially all straight line paths extending from the front face of the loudspeaker 110 to a position in front of the front face 158 of the grille in a direction parallel to the movement axis 112. The parameter A2/A1 is therefore very large (≈infinite) for this loudspeaker assembly 1.

In this example, the contoured surfaces 153 on the first subset of the grille elements 152 are contoured to closely match contours in the front face 132 of the diaphragm 130, and hence the rear face 156 of the grille 150 is contoured to closely match contours in the front face of the diaphragm.

This contour matching results in there being only a small volume V1 enclosed between the front face of the loudspeaker when the diaphragm is in its rest position and the rear face of the grille, with V1/V2 for this particular loudspeaker being V1/V2=0.4, and with A1/A3=3.5.

The parameters V1, V2, A1-A3 have already been defined elsewhere in this document.

Figure 2F:
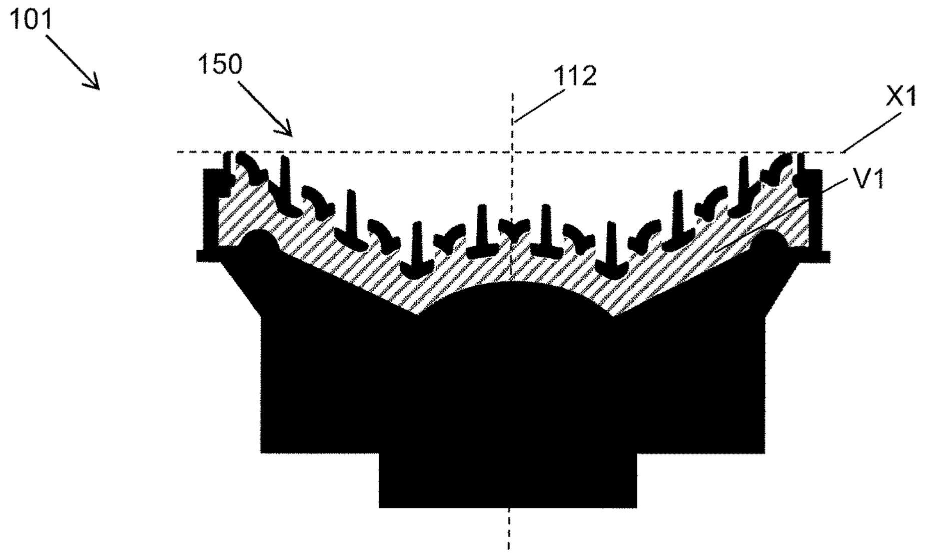
FIGS. 2F-G show the volumes V1 and V2 with respect to the loudspeaker assembly of FIG. 2A.

For the loudspeaker assembly 101 shown in FIG. 2A, the volume V1 is enclosed between the front face of the loudspeaker when the diaphragm is in its rest position and the rear face of the grille. In this example, the volume V1 is further enclosed by an additional structure (in this case the rim 151 of the grille 150) which extends around the movement axis 112. The volume V1 is illustrated in FIG. 2F(i) and 2F(ii), noting that V1 is shown here as including any space inside the/each gap in the rear face of the loudspeaker which has a direct line of sight to the front face of the loudspeaker in the direction of the movement axis, up to but extending no further than a plane X1, where X1 is a perpendicular to the movement axis 112 that has a position along the movement axis 112 corresponding to a forwardmost position of the grille 150 on the movement axis 112.

Figure 2G:
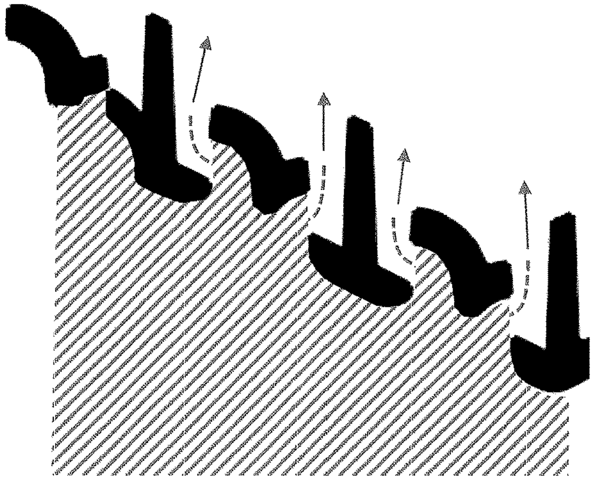
Figure 2G:
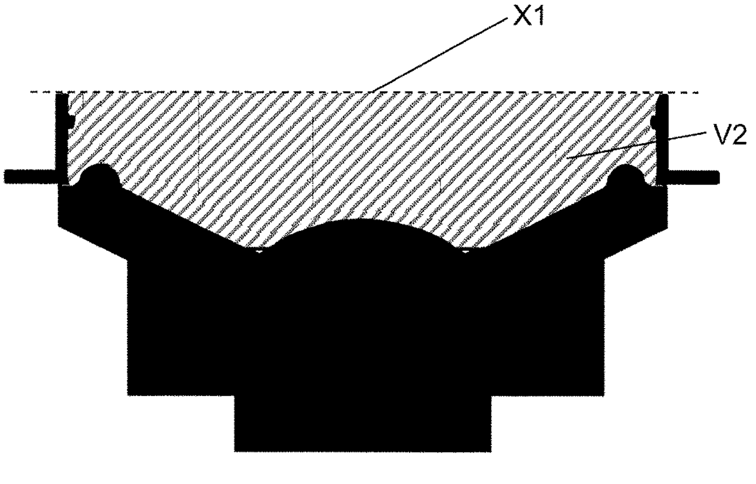

V2 is a volume of space [$cm^3$] enclosed between the front face of the loudspeaker when the diaphragm is in its rest position and the plane X1 perpendicular to the movement axis that has a position along the movement axis corresponding to a forwardmost position of the grille on the movement axis. This volume of space is illustrated in FIG. 2G.

For the loudspeaker assembly 101 shown in FIG. 2A, the movable part of the front face of the loudspeaker (used to determine A1) is the front face 132 of the diaphragm 130 (including the front face 139 of the dustcap 138), and the non-fixed part of the roll suspension 136 (so not including the part of the roll suspension which is fixed with respect to the frame 114, and not including the frame 114).

In this example, the close matching between the contoured surfaces 153 and contours in the front face 132 of the diaphragm 130 is also such that a distance h measured between the front face of the loudspeaker 110 when the diaphragm is in its rest position and the rear face 156 of the grille 150 (excluding the gaps 156A, noting that the gaps 156A do not form part of the rear face 156, which is instead formed by the contoured surfaces 153) in the direction of the movement axis, does not exceed 7 mm (where this criterion preferably applies for h as measured from any location on the front face 132 of the loudspeaker 110 for which a straight line, which extends from the location on the front face 132 of the loudspeaker 110 in the direction of the movement axis 112, intersects with the rear face of the grille).

Figure 2H:
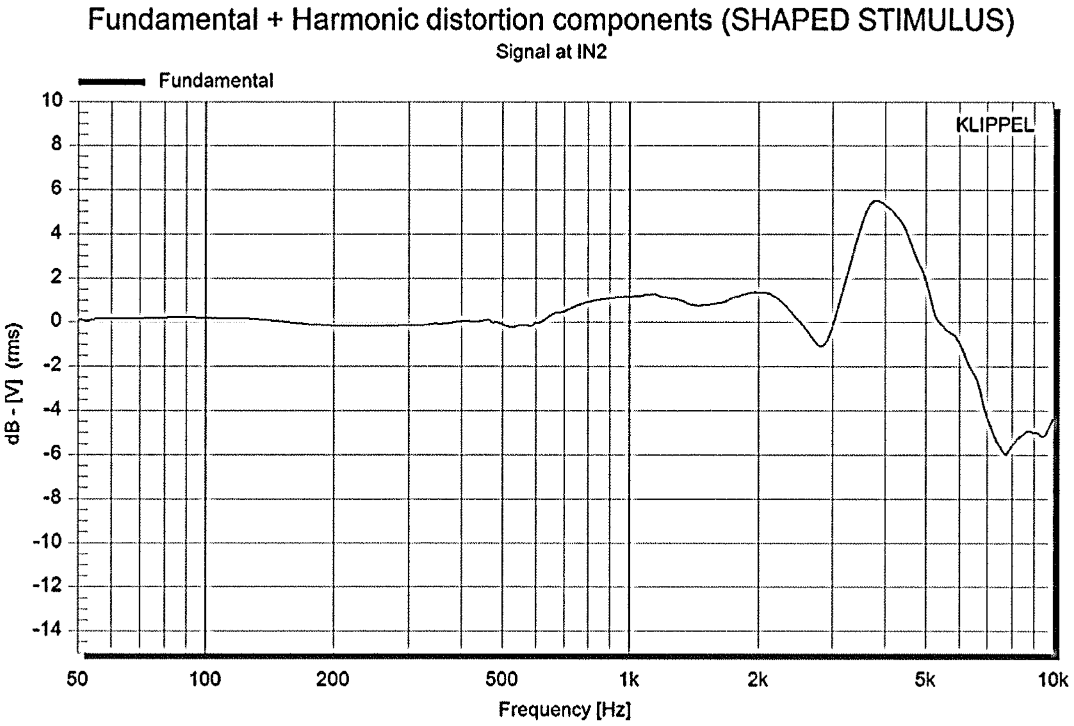
FIG. 2H shows the acoustic transfer function ATF(f) for the loudspeaker of FIG. 2A.

FIG. 2H shows the acoustic transfer function ATF(f) for the loudspeaker assembly 101 of FIG. 2A (smoothed to ⅓th octave band).

As shown by FIG. 2H, the acoustic transfer function ATF(f) is boosted to be higher than 3 dB for frequencies starting around 3.4 kHz up to frequencies around 5.1 kHz, meaning that the ATF is boosted by 3 dB for at least some frequencies in the range 1.8-7.2 kHz and in the more restricted range 1.8 kHz-3.6 kHz. Moreover, unlike the AFT shown in FIG. 1B, the ATF shown in FIG. 2H does not fall below −10 dB (or indeed −5 dB) at any frequency in the range 1.8 kHz-7.2 kHz.

This provides very useful acoustic properties for an AVAS loudspeaker assembly, where performance in the range 1.8 kHz-7.2 kHz, and especially the range 1.8 kHz-3.6 kHz, are particularly important for warning pedestrians of the presence of a road vehicle.

Without wishing to be bound by theory, the present inventors believe the improved performance of the loudspeaker assembly shown in FIG. 2A (compared with the example shown in FIG. 1A) is caused by minimizing the volume V1 enclosed between the front face of the loudspeaker 110 and the rear face 156 of the grille 150 so as to shift the resonance frequency of the acoustic mass spring (formed by the air in the grille 150 and air trapped between the diaphragm 130 and the rear face 156 of the grille 150) upwards near or above the upper limit of the intended frequency range over which the loudspeaker assembly 101 is intended to operate/rated for use (this upper limit being 5 kHz in this example).

Figure 2I:
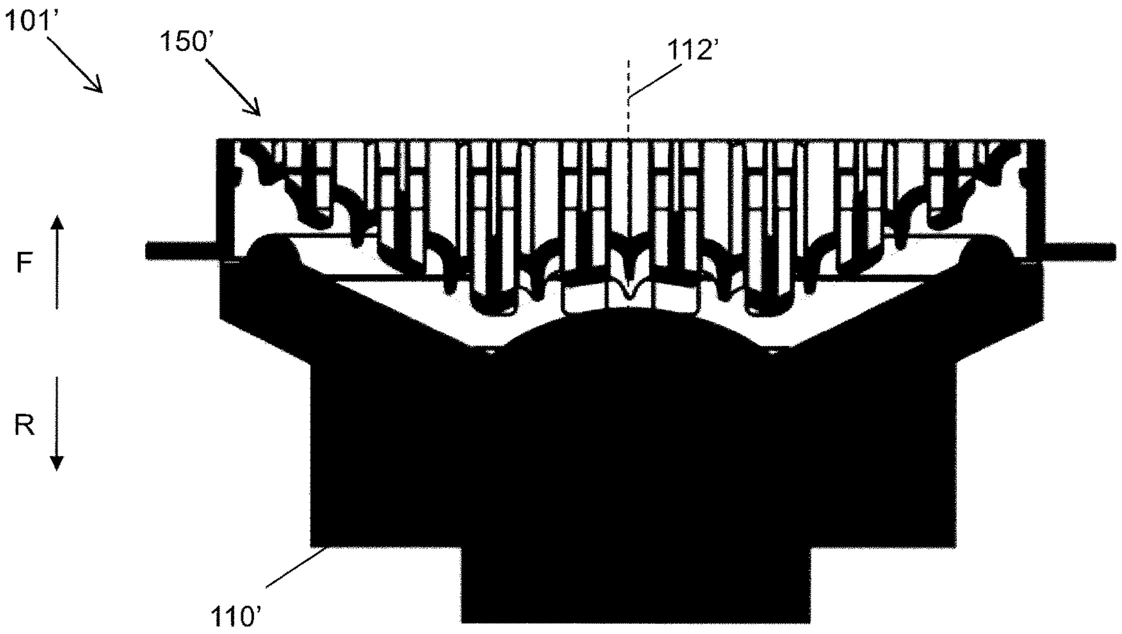
FIG. 2I shows a first alternative first loudspeaker, with a different grille.

FIG. 2I shows a first alternative first loudspeaker 101, with a different grille 150'. Alike features have been given alike reference numbers and do not need to be described further.

The grille 150' of FIG. 2I is different from the grille 150 of FIG. 2A, in that the grille 150' has a second subset of grille elements 154' that extend further toward the diaphragm, so that the rear of the grille 150' better follows the contours in the front face of the diaphragm.

Also shown in FIG. 2I is background elements of the grille 150', which have been excluded from other grill diagrams for clarity.

Figure 2J:
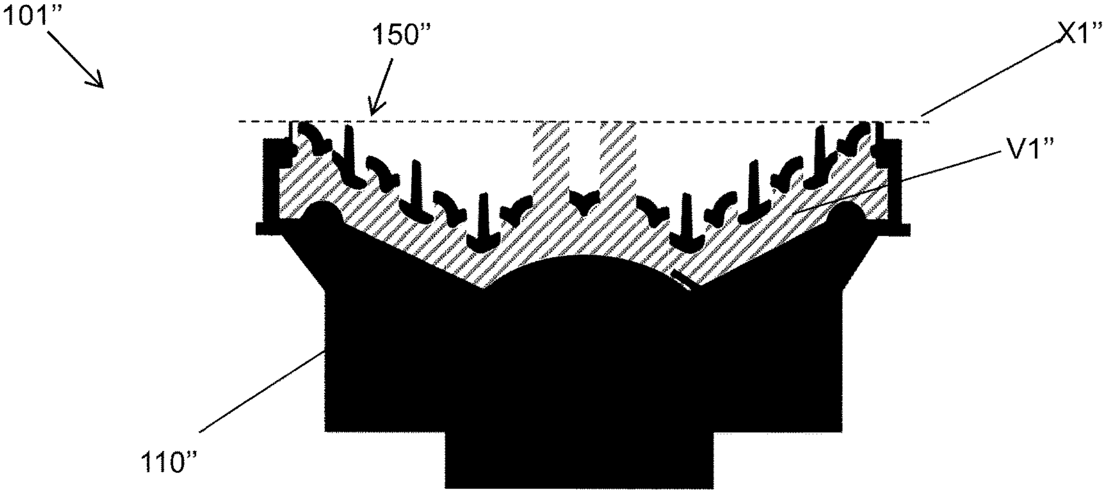
FIG. 2J shows a second alternative first loudspeaker, with a different grille.

FIG. 2J shows a second alternative first loudspeaker 101", with a different grille 150". Alike features have been given alike reference numbers and do not need to be described further.

In this example, there are gaps in the rear face of the grille 150" via which straight line paths (extending from the front face of the loudspeaker 110" to a position in front of the front face of the grille in a direction parallel to the movement axis) are not obstructed by the grille 150", so the volume V1" enclosed between the front face of the loudspeaker when the diaphragm is in its rest position and the rear face of the grille is defined as including the volume in that gap up to but extending no further than the plane X1", as shown in FIG. 2J.

Figure 3A:
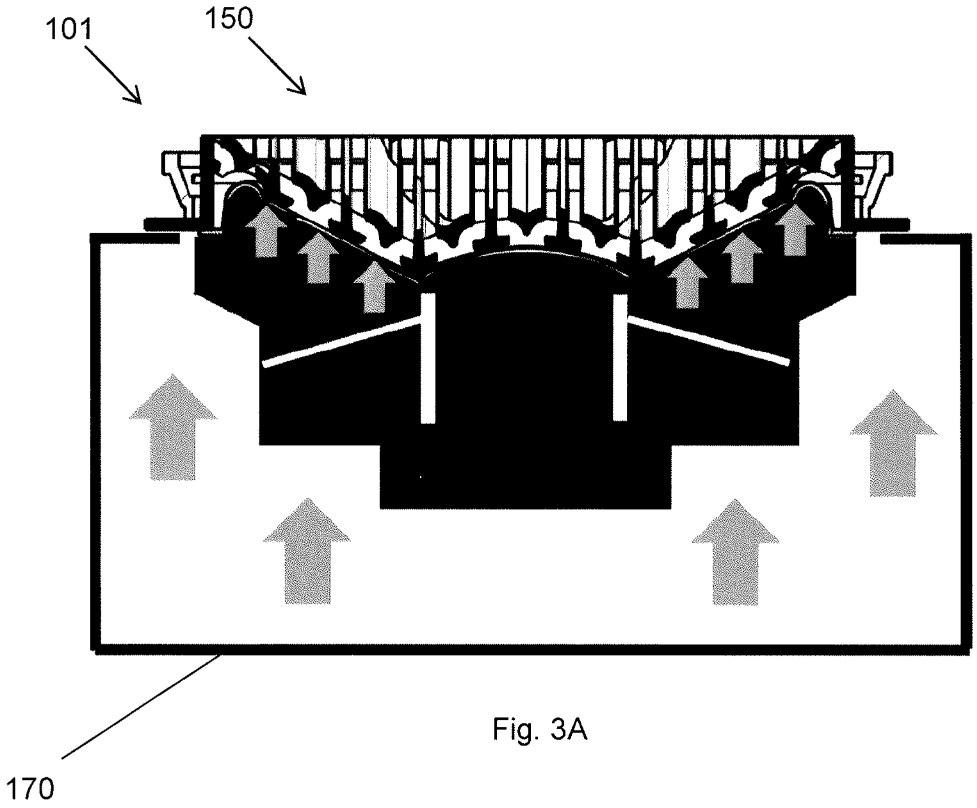
FIG. 3A illustrates a first overpressure situation in which a pressure at the rear face of the diaphragm exceeds that at the front face of the diaphragm due to an overpressure in an enclosure of the loudspeaker assembly of FIG. 2A.

FIG. 3A shows an example in which the loudspeaker assembly 101 of FIG. 2A includes an enclosure 170 configured to receive sound produced by the rear face 134 of the diaphragm 130, and to inhibit sound produced by the rear face 134 of diaphragm from leaking into the environment (the environment surrounding the enclosure 170). The enclosure 170 could take various forms, e.g. a plastic box, a volume in a vehicle (e.g. a cavity in a vehicle door).

FIG. 3A shows a first overpressure situation in which a pressure build up in the enclosure 170 at the rear face 134 of the diaphragm 130, due e.g. to fast temperature changes, becomes so significant that the diaphragm 130 has been pushed in the forwards direction F to a predefined mechanical stop position in which the front face 132 of the diaphragm 130 is brought into contact with the rear face 156 of the grille 150 at multiple locations dispersed across the front face 132 of the diaphragm 130. Specifically, in the predefined mechanical stop position shown in FIG. 3A, each contoured surface 153 physically contacts the front face 132 of the diaphragm 130 (and thus the rear face 156 of the grille 150 physically contacts the front face 132 of the diaphragm 130 at multiple locations dispersed across the front face 132 of the diaphragm), so as to prevent the diaphragm 130 from moving beyond the predefined mechanical stop position.

Because the rear face 156 of the grille 150 is configured to physically contact the front face 132 of the diaphragm 130 at multiple locations dispersed across the front face 132 of the diaphragm 130 when the diaphragm 130 is pushed in the forwards direction F to the predefined mechanical stop position in the manner shown in FIG. 3A(ii), the rear face 156 of the grille 150 acts as a mechanical stop which prevents the diaphragm from moving beyond the predefined mechanical stop position, and thus helps to prevent damage to the loudspeaker 110 in the first overpressure situation.

Note that if the rear face 156 of the grille 150 did not provide this mechanical stop function, then the overpressure situation illustrated in FIG. 3A may have caused damage to the loudspeaker 110, e.g. by deforming the diaphragm 130, by damaging a suspension 136, 137 which suspends the diaphragm 130 from a frame 114 of the loudspeaker 110, or by removing the voice coil 124 from the air gap. The voice coil 124 being removed from the air gap is a scenario in which the loudspeaker 110 may lose all function, which is particularly dangerous if the loudspeaker assembly is used in an AVAS (but is possible with traditional AVAS grille designs).

The predefined mechanical stop position is preferably further along the movement axis 112 in the forwards direction F than the diaphragm 130 will be moved to by the drive unit 120 during normal operation of the loudspeaker assembly 101, e.g. when pressure is equalised at both the front and rear faces of the diaphragm. This is because it is preferable for there to be no physical contact between the rear face 156 of the grille 150 and the front face 132 of the diaphragm 130 during normal operation of the loudspeaker assembly 101, since this would create unpleasant buzzing noises.

Figure 3B:
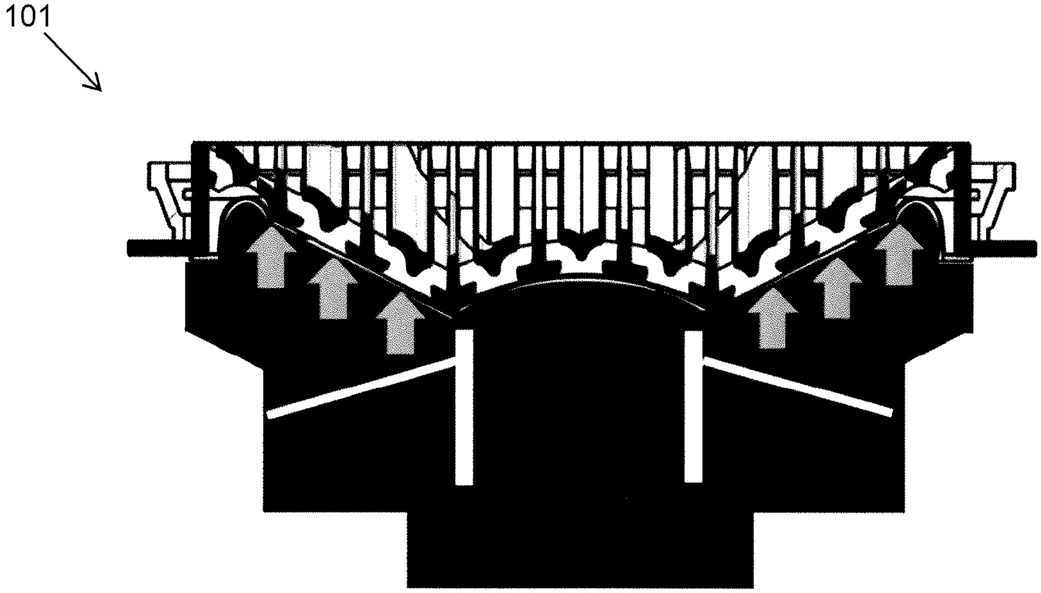
FIG. 3B illustrates a second overpressure situation in which a pressure at the rear face of the diaphragm exceeds that at the front face of the diaphragm due to the loudspeaker assembly of FIG. 2A being submerged in water.

FIG. 3B show a second overpressure situation, this time with the loudspeaker assembly being mounted in an infinite baffle configuration. In the second overpressure situation, a pressure at the rear face 134 of the diaphragm 130, due e.g. to the loudspeaker assembly being submerged in water or by the Venturi effect (e.g. caused by driving a vehicle incorporating the loudspeaker assembly with windows or roof open), becomes so significant that the diaphragm 130 has been pushed in the forwards direction F to the predefined mechanical stop position, but is prevented from going further by the rear face 156 of the grille 150, which thus helps to prevent damage to the loudspeaker 110 in the second overpressure situation.

Figure 4A:
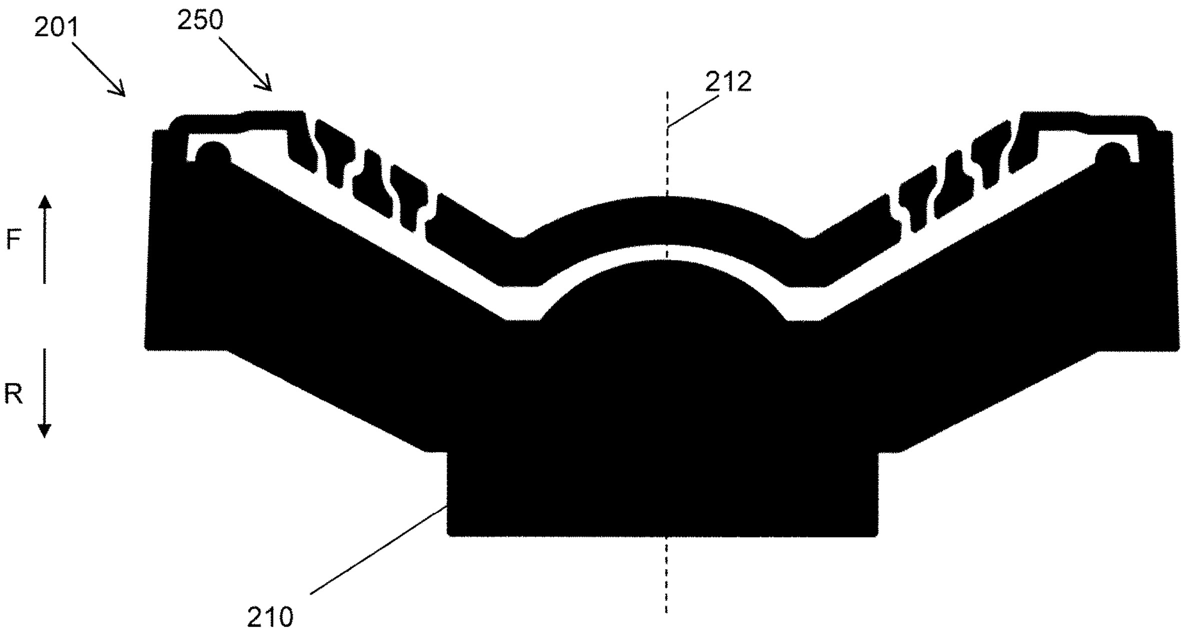
FIG. 4A shows a second loudspeaker assembly according to the present disclosure.

FIG. 4A shows a cross-section of a second loudspeaker assembly 201 according to the present disclosure.

Figure 4B:
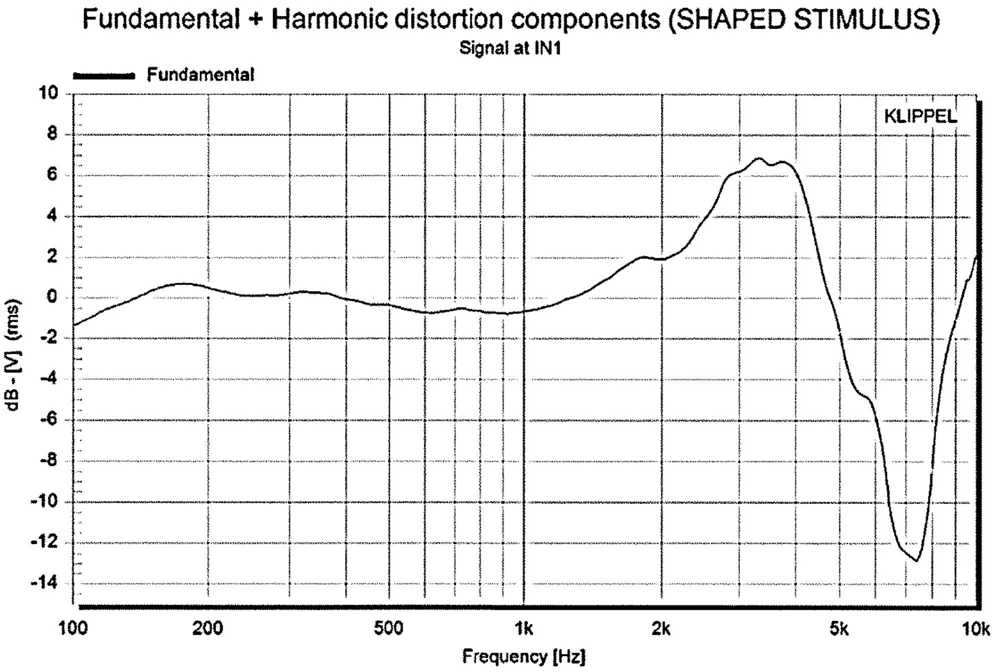
FIG. 4B shows the acoustic transfer function ATF(f) for the loudspeaker of FIG. 4A.

FIG. 4B shows the acoustic transfer function ATF(f) for the loudspeaker assembly 201 of FIG. 4A (smoothed to ⅓th octave band).

Features of the second loudspeaker assembly 201 which correspond to features already described in relation to the first loudspeaker assembly 101 have been given alike reference numerals, and need not be described further herein except where stated below.

For the loudspeaker assembly 201 shown in FIG. 4A, the parameter V1/V2=0.35, the parameter A1/A2 is very large (≈infinite) and the parameter A1/A3 is 11.

In this example, the grille 250 is thus similar to that shown in FIG. 2A, except that there is closer matching between the contours of the grill 250 and the front surface of the loudspeaker 210 (V1/V2 is smaller) and the grille 250 is more acoustically closed due to there being fewer passages extending from gaps in the rear face of the grille to gaps in the front face of the grille (hence A1/A3 is larger).

The particular grille 250 of FIG. 4A is designed to be used in a frequency range 1.8 kHz-3.6 kHz which is a particularly important frequency band for the production of sound by an AVAS loudspeaker. The loudspeaker assembly 201 may be rated for use in this frequency range.

As noted above, the rear face of the grille 250 is contoured to closely match contours in the front face of the diaphragm, which results in a small value of V1/V2 which results in an acoustic transfer function ATF(f) having desirable properties. Here it is noted that FIG. 4B shows that the acoustic transfer function is higher than 3 dB for frequencies starting around 2.3 kHz up to frequencies around 4.3 kHz, meaning that AFT is higher than 3 dB for two thirds of the ⅓th octave bands in the frequency range 1.8 kHz-3.6 kHz. Moreover, the acoustic transfer function is higher than 0 dB for the entire frequency range 1.8 kHz-3.6 kHz. So not only is a large drop in ATF(f) avoided in the frequency range of interest, but a boost is maintained across all frequencies in the frequency range of interest.

The present inventors have observed that a more acoustically opaque grille (i.e. higher A1/A3) results in a stronger boost in ATF at lower frequencies, albeit at the expense of a deeper drop in ATF at subsequent frequencies. This effect can be seen in FIG. 4B, which shows a larger boost in ATF compared with the ATF shown in FIG. 2I, which the present inventors (without wishing to be bound by theory) believe results from the more acoustically closed grille of FIG. 4A compared with the more acoustically open grille of FIG. 2A. This indicates that a more acoustically transparent grille (such as grille 150 shown in FIG. 2A) may be better suited to a loudspeaker assembly intended for use across a wider frequency range, e.g. 1.8 kHz-7.2 kHz, whereas a more acoustically opaque grille (such as grill 250 shown in FIG. 4A) may be better suited to a loudspeaker assembly intended for use across a narrower frequency range, e.g. 1.8 kHz-3.6 kHz.

Of course, the grille must have some degree of acoustic transparency, in order to permit airborne sound waves produced by the front face of the diaphragm to pass through the grille when the loudspeaker is in use.

In additional examples (not illustrated), the grill 250 may be replaced by a one-piece grille element which provides the rear and front faces of the grille, and which has through-holes which define the passages extending from gaps in the rear face of the grille to gaps in the front face of the grille. In such examples, the passages defined by the through-holes in the one-piece grille element may be non-linear passages, each having at least one bend therein, and the grille may physically obstructs substantially all straight line paths extending from the front face of the diaphragm to a position in front of the front face of the grille in a direction parallel to the movement axis.

The loudspeaker assemblies described herein may find application e.g. in the automotive industry, in the consumer industry, in architectural industry (e.g. mounting loudspeaker assemblies in ceiling/walls), in the home entertainment industry (where loudspeaker assembly is for use outdoors), or in the PA industry.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

UN Regulation 138 dated 16 November 2017 (E/ECE/324/Rev.2/Add.137/Rev.1-E/ECE/TRANS/505/Rev.2/Add.137/Rev.1)
"Federal Motor Vehicle Safety Standard No. 141, Minimum Sound Requirements for Hybrid and Electric Vehicles" (83 FR 8182; NHTSA-FMVSS141)
U.S. Pat. No. 3,909,530
U.S. Pat. No. 3,995,125
US2012/194328A1
EP2530951A1
JP3642075B2
JPH08230573A
JPH09327082A
JPS5696784U
JPS5726180U
US2012/294120A1
JPH07107579A

The invention claimed is:

1. A loudspeaker assembly configured for use outdoors in an Acoustic Vehicle Alerting System, the loudspeaker assembly comprising:

a loudspeaker including a drive unit and a diaphragm, wherein the drive unit is configured to move the diaphragm along a movement axis, wherein the diaphragm has a front face that faces in a forwards direction parallel to the movement axis and a rear face that faces in a rearwards direction parallel to the movement axis, wherein the loudspeaker has a front face that faces in the forwards direction and includes the front face of the diaphragm; and a grille positioned in front of the front face of the loudspeaker, with a rear face of the grille facing in the rearwards direction toward the front face of the loudspeaker, and with a front face of the grille facing in the forwards direction, wherein the grille is configured to permit sound produced by the front face of the diaphragm to pass through the grille when the loudspeaker is in use, and to inhibit the ingress of water incident on the front face of the grille from entering into a space enclosed between the rear face of the grille and the front face of the loudspeaker when the loudspeaker is in use, wherein V1/V2≤0.7, wherein V1 is a volume of space ($cm^3$) enclosed between the front face of the loudspeaker when the diaphragm is in its rest position and the rear face of the grille, and V2 is a volume of space ($cm^3$) enclosed between the front face of the loudspeaker when the diaphragm is in its rest position and a plane perpendicular to the movement axis that has a position along the movement axis corresponding to a forwardmost position of the grille on the movement axis, and wherein A1/A3≥6, wherein A1 is the area ($cm^2$) corresponding to the movable part of the front face of the loudspeaker as projected onto a plane perpendicular to the movement axis, and A3 is the area ($cm^2$) which is the sum of cross-sectional areas for all openings in the grille which allow for airborne sound propagation through the grille, wherein for each of said openings, the cross-sectional area of the opening is defined as the minimum cross-section of the opening along the path of airborne sound propagation through the opening.

2. A loudspeaker assembly according to claim 1, wherein V1/V2≤0.5.

3. A loudspeaker assembly according to claim 1, wherein A1/A2≥5, wherein A2 is the area ($cm^2$) within A2 which has a direct line of sight to the front face of the loudspeaker in the direction of the movement axis.

4. A loudspeaker assembly according to claim 1, wherein the acoustic transfer function is higher than 3 dB for at least some frequencies in the range 1.8 kHz-7.2 kHz.

5. A loudspeaker assembly according to claim 1, wherein the acoustic transfer function is higher than 0 dB for at least half of the ⅓th octave bands in the range 1.8 kHz-3.6 kHz.

6. A loudspeaker assembly according to claim 1, wherein the acoustic transfer function does not fall below −5 dB at any frequency in a frequency range in which the loudspeaker assembly is rated for use.

7. A loudspeaker assembly according to claim 1, wherein the grille has a labyrinthine structure which defines non-linear passages extending from gaps in the rear face of the grille to gaps in the front face of the grille.

8. A loudspeaker assembly according to claim 1, wherein the grille is formed by a plurality of grille elements extending across the front face of the loudspeaker, and arranged with respect to each other so as to define passages extending from gaps in the rear face of the grille to gaps in the front face of the grille.

9. A loudspeaker assembly according to claim 8, wherein the rear face of the grille is formed by contoured surfaces on at least a subset of the grille elements, spaced apart from each other to provide the gaps in the rear face of the grille.

10. A loudspeaker assembly according to claim 8, wherein each contoured surface on a grille element that forms part of the rear face of the grille is configured to physically contact the front face of the diaphragm when the diaphragm is pushed in the forwards direction to a predefined mechanical stop position.

11. A loudspeaker assembly according to claim 1, wherein the grille is formed by a one-piece grille element which provides the front and rear faces of the grille, and which has through-holes which define passages extending from gaps in the rear face of the grille to gaps in the front face of the grille.

12. A loudspeaker assembly according to claim 1, wherein the rear face of the grille is configured to physically contact the front face of the diaphragm at multiple locations dispersed across the front face of the diaphragm when the diaphragm is pushed in the forwards direction to a predefined mechanical stop position, so as to prevent the diaphragm from moving beyond the predefined mechanical stop position when the loudspeaker is in use.

13. A loudspeaker assembly according to claim 1, wherein the loudspeaker assembly is configured for use in a road vehicle with the front face of the grille exposed to an outdoor environment.

14. A loudspeaker assembly according to claim 1, wherein loudspeaker assembly forms part of the Acoustic Vehicle Alerting System.

* * * * *